United States Patent
Chow et al.

(10) Patent No.: US 9,943,987 B2
(45) Date of Patent: Apr. 17, 2018

(54) EXTRUDER FEED PATH VIBRATOR

(71) Applicant: Mold-Masters (2007) Limited, Georgetown, ON (CA)

(72) Inventors: Philip Chow, Mississauga (CA); Allan Shantz, Milton (CA)

(73) Assignee: MOLD-MASTERS (2007) LIMITED, Georgetown, ON (CA)

( * ) Notice: Subject to any disclaimer, the term of this patent is extended or adjusted under 35 U.S.C. 154(b) by 403 days.

(21) Appl. No.: 14/580,250

(22) Filed: Dec. 23, 2014

(65) Prior Publication Data

US 2015/0183149 A1    Jul. 2, 2015

Related U.S. Application Data (60) Provisional application No. 61/920,807, filed on Dec. 26, 2013.

(51) Int. Cl.
*B29C 31/02* (2006.01)
*B29C 45/18* (2006.01)
(Continued)

(52) U.S. Cl.
CPC ............ *B29C 31/004* (2013.01); *B29C 31/02* (2013.01); *B29C 31/04* (2013.01); *B29C 45/585* (2013.01); *B29C 47/0076* (2013.01); *B29C 47/0078* (2013.01); *B29C 47/1018* (2013.01); *B29C 47/1027* (2013.01); *B29C 47/44* (2013.01); *B29C 47/822* (2013.01); *B30B 15/308* (2013.01); *B29C 45/18* (2013.01);
(Continued)

(58) Field of Classification Search
CPC ....... B29C 31/004; B29C 31/02; B29C 31/04; B29C 45/18; B29C 45/1875; B29C 45/585; B29C 47/0076; B29C 47/0078; B29C 47/1018; B29C 47/1027; B29C 47/44; B29C 2045/1875; B30B 15/302; B30B 15/308
See application file for complete search history.

(56) References Cited

U.S. PATENT DOCUMENTS 1,942,581 A    1/1934   Tolman, Jr.
2,174,348 A    9/1939   Damond
(Continued)

FOREIGN PATENT DOCUMENTS

CN    103507214    1/2014
CN    103507215    1/2014
(Continued)

OTHER PUBLICATIONS

EP Search Report, EP Application No. 14 00 4384.5, Jun. 8, 2015.

*Primary Examiner* — Alison L Hindenlang
*Assistant Examiner* — Joseph S Leyson
(74) *Attorney, Agent, or Firm* — Medler Ferro Woodhouse & Mills (57) ABSTRACT

A device for imparting vibrational energy to polymeric pellets in a feed path of an extruder is disclosed. The device includes a feed path vibrator having an elongate imparting portion for being disposed within the feed path of the extruder, and a transfer portion extending from the imparting portion. The transfer portion is configured for coupling to a source of vibration energy, and the elongate imparting portion includes at least one twisted portion along its length.

22 Claims, 9 Drawing Sheets

(51) Int. Cl.
  *B29C 47/10* (2006.01)
  *B30B 15/30* (2006.01)
  *B29C 31/00* (2006.01)
  *B29C 47/00* (2006.01)
  *B29C 31/04* (2006.01)
  *B29C 45/58* (2006.01)
  *B29C 47/44* (2006.01)
  *B29C 47/82* (2006.01)
  *B29L 31/00* (2006.01)

(52) U.S. Cl.
  CPC    *B29C 2045/1875* (2013.01); *B29C 2791/008* (2013.01); *B29L 2031/00* (2013.01)

(56) References Cited

U.S. PATENT DOCUMENTS

| | | |
|---|---|---|
| 2,254,448 A | 9/1941 | Pursel |
| 2,416,099 A | 2/1947 | Joslyn |
| 2,478,207 A | 8/1949 | Robinson |
| 2,569,085 A | 9/1951 | Wood et al. |
| 2,598,500 A | 5/1952 | Burke |
| 2,772,862 A | 12/1956 | Van Suchtelen |
| 2,818,199 A * | 12/1957 | Fain ........................ B01J 8/002 222/189.02 |
| 3,124,278 A | 3/1964 | Cox |
| 3,173,583 A | 3/1965 | Wahl |
| 3,346,917 A | 10/1967 | Lennox |
| 3,366,282 A | 1/1968 | Lucas |
| 3,773,231 A | 11/1973 | Wahl |
| 3,998,439 A * | 12/1976 | Feix ........................ B29C 45/1816 222/240 |
| 4,270,675 A | 6/1981 | Wicks et al. |
| 4,708,534 A | 11/1987 | Gallant |
| 6,068,108 A | 5/2000 | Dudley |
| 6,267,495 B1 * | 7/2001 | Hurst ........................ B01F 5/26 366/156.2 |
| 6,311,438 B1 | 11/2001 | Haquette |
| 6,708,851 B2 | 3/2004 | DaSilva |
| 7,731,877 B2 | 6/2010 | Takeuchi et al. |
| 8,408,424 B2 | 4/2013 | Saunders et al. |
| 2007/0122515 A1 * | 5/2007 | Kamite ........................ B29B 7/48 425/200 |

FOREIGN PATENT DOCUMENTS

| | | |
|---|---|---|
| DE | 19 10 710 A1 | 9/1970 |
| DE | 26 57 932 A1 | 1/1978 |
| DE | 89 04 538 U1 | 8/1990 |
| GB | 2 084 117 A | 4/1982 |
| JP | S58-100031 A | 6/1983 |

* cited by examiner

EXTRUDER FEED PATH VIBRATOR

CROSS-REFERENCE TO RELATED APPLICATION

This application claims the benefit under 35 U.S.C. § 119(e) of U.S. Appl. No. 61/920,807 filed Dec. 26, 2013, the disclosure of which is incorporated by reference herein in its entirety.

FIELD

This disclosure relates to an extruder, and more particularly to a feed assembly for an extruder.

BACKGROUND

Molding is a process whereby raw plastic or polymeric pellets are transformed into molded articles by way of an extruder that plasticizes the raw pellets and forces them into the mold, or through a die, that defines the shape of the article(s) being produced. Raw plastic pellets are gravitationally feed to the extruders' plasticizing assembly by a feed assembly that includes a hopper, which is coupled directly to the extruder, or is coupled to the extruder by a tubular passageway. Often, gravity alone is sufficient for ensuring a reliable, or stable, flow of pellets between the feed assembly and the plasticizing assembly; however, in some applications, the pellets have a tendency to interlock and impede the flow of pellets between the feed assembly and the plasticizing assembly. This phenomenon, known in the art as "bridging", results in the flow of plastic pellets becoming restricted, or even stopped altogether.

To prevent restrictions to the gravitational flow of pellets an operator can monitor the feed and flow of pellets in the feed assembly and manually clear any blockage as it begins to accumulate. However, this solution requires human intervention, and is therefore prone to inconsistencies, and is also only suitable when the operator has access to the stoppage or bridging area.

Vibrators have been coupled to the feed assembly at a location proximate to the suspected bridging area in order to vibrate the tubular passageway within which the "bridged" pellets are located. In some applications this solution has a tendency to exacerbate the problem by tightly compacting and interlocking the pellets in the bridging zone, again requiring operator intervention to clear the blockage.

Another solution has been to mount a cylindrical rod to extend within the feed assembly that is connected to a source of vibration that is external to the flow of pellets. In some applications, this solution has the tendency to compact and interlock the pellets between the rod and the internal walls of the feed assembly.

Another solution has been to mount a linear actuator within the feed assembly at a potential blockage point to "stab" at pellets to prevent them from interlocking. This solution is only practical in locations of the feed path that are large enough to accommodate a linear actuator within the flow of pellets, and may also cause a blockage of pellets upstream from the linear actuator.

Another solution has been to rotate an auger within the feed path. However this solution requires a relatively complex assembly to power the auger, and is only practical in applications where the feed assembly can accommodate an auger.

SUMMARY

Embodiments hereof are directed towards a device for imparting vibrational energy to polymeric pellets in a feed path of an extruder. The device includes a feed path vibrator having an elongate imparting portion for being disposed within the feed path of the extruder, and a transfer portion extending from the imparting portion. The transfer portion is configured for coupling to a source of vibration energy, and the elongate imparting portion includes at least one twisted portion along its length.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings may not be to scale.

DETAILED DESCRIPTION OF THE INVENTION

Specific embodiments are now described with reference to the figures. The following detailed description is merely exemplary in nature and is not intended to limit the invention or the application and uses of the invention. In the following description, "downstream" is used with reference to the direction of mold material flow from a source of raw polymeric pellets to a nozzle outlet of an extruder, and also to the order of components or features thereof through which the molding material travels from supply of raw polymeric pellets to the nozzle outlet of the extruder, whereas "upstream" is used with reference to the opposite direction. "Top", "bottom", "upper", "lower", and "side" are used with reference to the orientation of the figures as shown on their respective pages. Furthermore, there is no intention to be bound by any expressed or implied theory presented in the preceding technical field, background, brief summary or the following detailed description.

Figure 1:
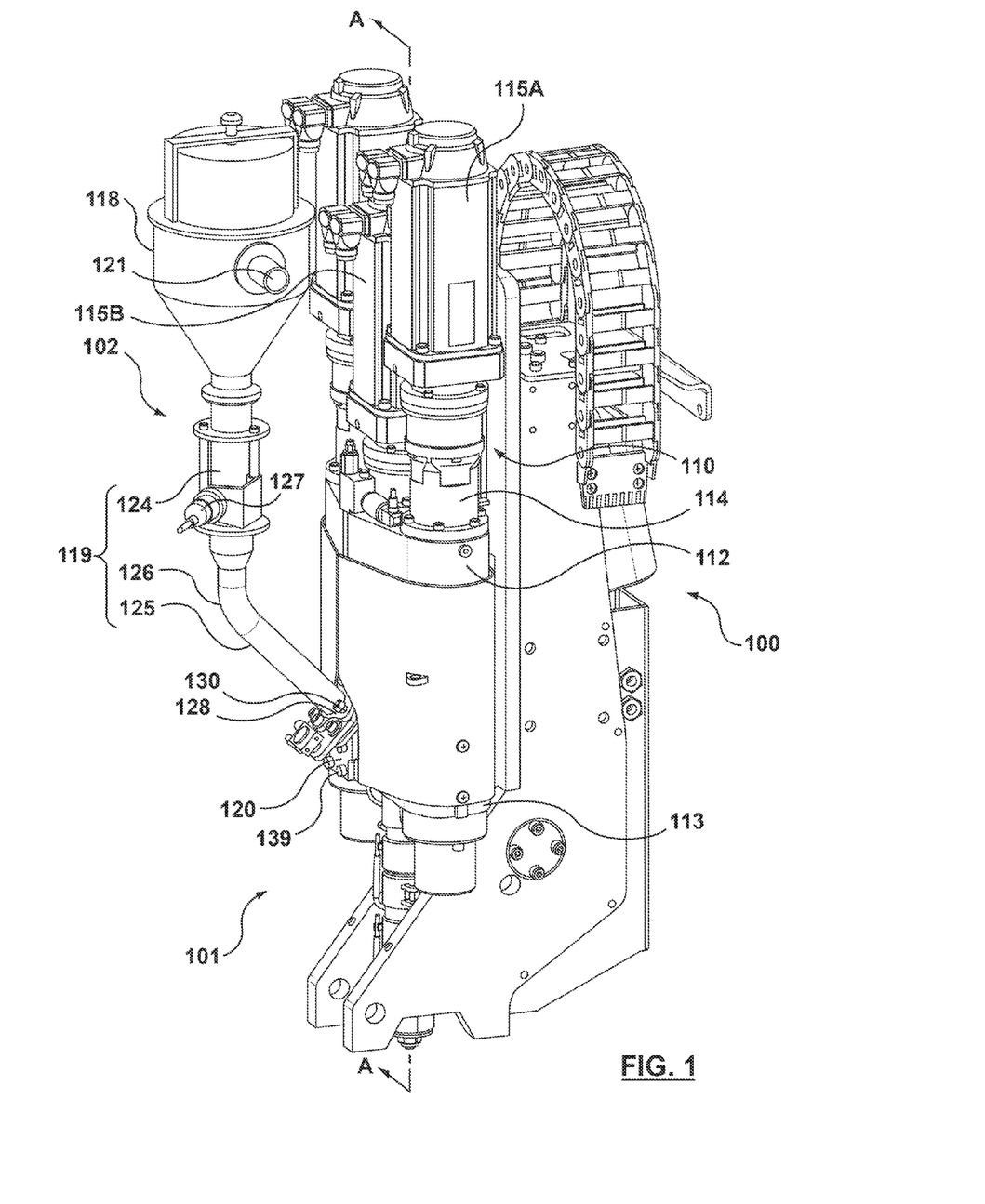
FIG. 1 is a perspective view of an extruder.
Figure 1A:
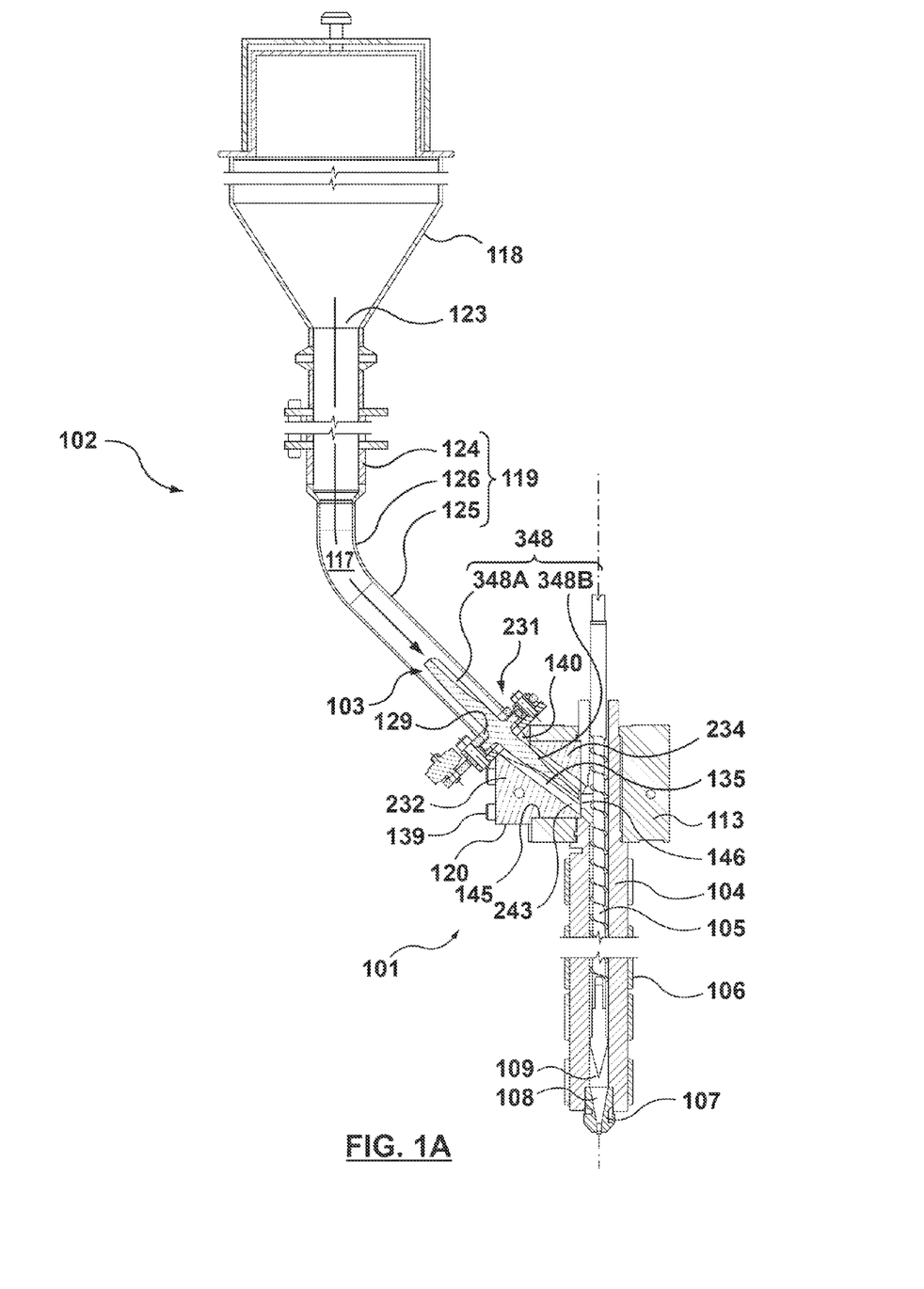
FIG. 1A is a sectional view taken along line A-A of FIG. 1 showing a plasticizing assembly and a feed assembly of the extruder, and a feed path vibrator in accordance with an embodiment hereof.

Referring to FIG. 1 and FIG. 1A, in which FIG. 1 is a perspective view of an extruder 100, and FIG. 1A is a sectional view taken along line A-A of FIG. 1 showing a plasticizing assembly 101 and a feed assembly 102 of extruder 100, and a feed path vibrator 103 in accordance with an embodiment hereof. As shown in FIG. 1A, plasticizing assembly 101 includes a barrel 104, a screw 105 rotatably and slideably disposed in barrel 104, and heaters 106. A nozzle 107 which defines an outlet of extruder 100 is coupled to the downstream end of barrel 104. Nozzle 107 includes a nozzle channel 108 that is in communication with a barrel channel 109 extending through barrel 104 between screw 105 and an interior surface of barrel 104. Extruder 100 as described herein is an injection unit for use in an injection molding application by way of example and not limitation.

Turning to FIG. 1, and also to FIG. 1A, extruder 100 includes a drive assembly 110 that provides linear and rotary action to screw 105. Drive assembly 110 includes an injection housing 112 and a barrel housing 113 that are coupled together by a linear drive mechanism 114, which may include a pair of ball screws (not shown) that extend through injection housing 112 and are received in respective ball nuts (not shown) located in barrel housing 113. An upstream end of barrel 104 is fixedly coupled to barrel housing 113, whereas an upstream end of screw 105 is coupled to injection housing 112, and moves therewith. A motor, such as servo motor 115A, is coupled to each ball screw for rotation thereof. During the injection phase of the molding cycle, activating linear drive mechanism 114, i.e. rotation of the ball screws relative to the ball nuts, translates rotary motion of servo motor 115A into linear motion of injection housing 112 which displaces screw 105 within barrel 104. Another motor, such as servo motor 115B, is coupled to screw 105 for providing rotational movement thereto.

Continuing with FIG. 1 and FIG. 1A, in operation, raw polymeric pellets from an external source (not shown) are introduced to plasticizing assembly 101 via feed assembly 102. To accumulate a shot of molding material, screw 105 is simultaneously rotated and translated in the upstream direction relative to barrel 104 which conveys pellets downstream within barrel 104. Such rotation and upstream movement of screw 105 relative to barrel 104 converts the raw polymeric pellets into molten polymeric material by a combination of screw 105 kneading the pellets within barrel 104, and by heat applied to barrel 104 via band heaters 106. When a desired shot volume has accumulated at the downstream end of barrel 104, rotation of screw 105 is halted, and screw 105 is translated in the downstream direction within barrel 104 to inject the newly plasticized shot of molding material through nozzle channel 107 and into a mold. A check ring (not shown) is provided near the downstream end of screw 105 to prevent backflow of molten plastic within barrel 104 during the injection phase of the molding cycle.

Continuing with FIG. 1A, feed assembly 102 defines a feed path 117 extending through a hopper 118, a tubular passageway 119, and a feed block 120. Hopper 118 is an inverted conical or otherwise shaped container at the upstream end of feed assembly 102 for holding a supply of raw molding material. Hopper 118 includes an inlet 121 (shown in FIG. 1) through which raw polymeric pellets are supplied to feed assembly 102, and includes an outlet 123 from which the polymeric pellets flow into tubular passageway 119.

Tubular passageway 119 includes an upper feed pipe 124, a lower feed pipe 125, and an elbow 126 therebetween. Upper feed pipe 124 and lower feed pipe 125 are hollow elongate tubes that are generally straight. Upper feed pipe 124 optionally includes a level sensor 127 (shown in FIG. 1) for triggering an autoloader (not shown) to replenish the supply of raw polymeric pellets in hopper 118. Continuing with in FIG. 1, lower feed pipe 125 includes a flange 128 that extends radially outward from the downstream end thereof. Flange 128 is generally lozenge shaped, and includes a feed aperture 129 (shown in FIG. 1A), which is a portion of feed path 117, and a pair of mounting holes 130 (one of which is visible in FIG. 1) that extend through flange 128, and by which tubular passageway 119 is coupled to extruder 100. Continuing with FIG. 1, elbow 126 defines a bend in feed path 117 that reorients the general flow direction of polymeric pellets within tubular passageway 119. In the current embodiment, the bend in feed path that is defined by elbow 126 is around 45°. As shown in FIG. 1, extruder 100 is configured to be positioned in a vertical orientation by way of example and not limitation. Accordingly, upper feed pipe 124 and hopper 118 are also oriented vertically, or substantially vertically, so as to promote gravitational flow of polymeric pellets from hopper 118, whereas lower feed pipe 125 is positioned at an angle to upper feed pipe 124 to direct the flow of pellets into plasticizing assembly 101. In an embodiment (not shown) extruder 100 may be configured to be positioned in a horizontal orientation. In such a configuration tubular passage way 119 may not be required, and instead, feed path vibrator 103 can be positioned between hopper 118 and the inlet to plasticizing assembly 101.

Figure 2:
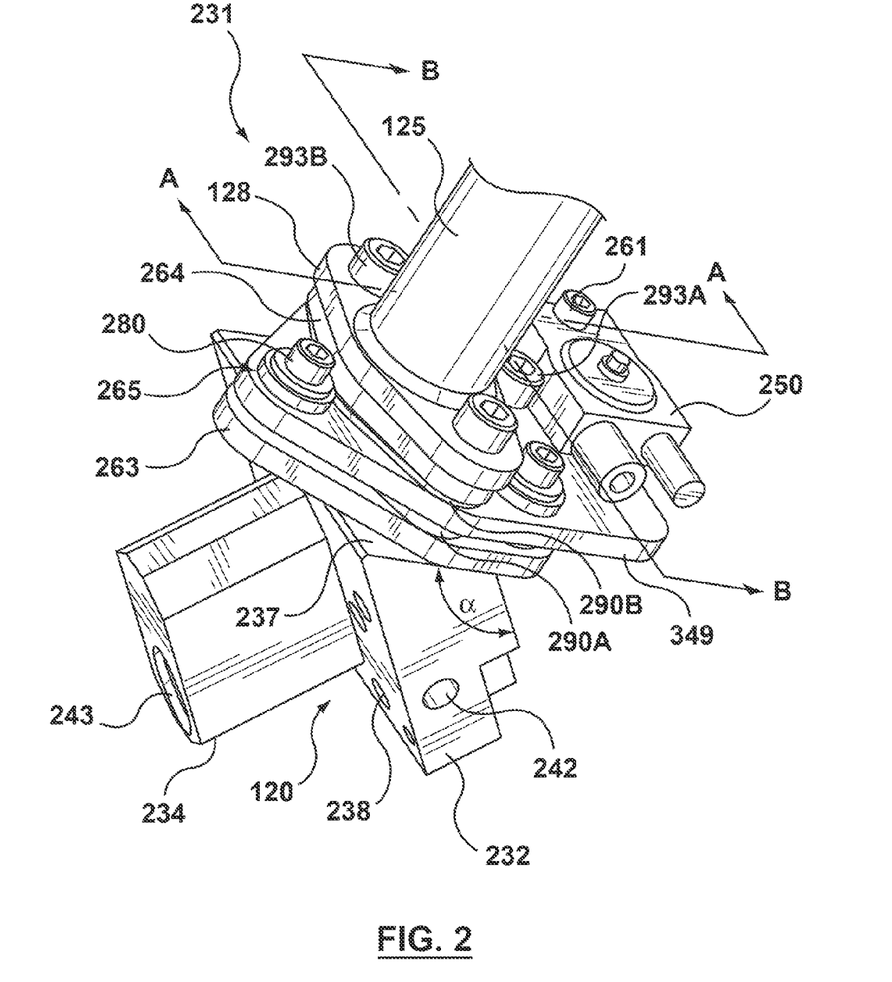
FIG. 2 is a side perspective view of a vibrator mounting assembly in accordance with an embodiment hereof.

Continuing with FIG. 1A, and also referring to FIG. 2, in which FIG. 2 is a side perspective view of a vibrator mounting assembly 231 in accordance with an embodiment hereof. To promote the flow of polymeric pellets from feed assembly 102 to plasticizing assembly 101, feed assembly 102 includes feed path vibrator 103 for imparting vibrational energy to raw polymeric pellets within feed path 117. Feed path vibrator 103 is coupled to feed assembly 102 by mounting assembly 231 which, as shown in FIG. 1A, is positioned between lower feed pipe 125 and feed block 120.

Feed block 120 connects feed assembly 102 and plasticizing assembly 101. Feed block 120 includes a mounting portion 232 and an extension portion 234, and defines a passageway 135 (shown in FIG. 1A) which is a portion of feed path 117. A plurality of bores 238 extend through mounting portion 232 to receive a respective fastener 139 (shown in FIG. 1A) which is used to couple feed block 120 to barrel housing 113. Mounting portion 232 includes an inlet surface 237 that defines an inlet 140 of passageway 135. Coupling bores 241 (shown in FIG. 2B) extend into mounting portion 232 from inlet surface 237, and are in line with mounting bores 130 in lower feed pipe flange 128. Extension portion 234 of feed block 120 extends into an opening 145 (shown in FIG. 1A) in barrel housing 113, and defines an outlet 243 of feed path 117 that is aligned with an inlet 146 (shown in FIG. 1A) of plasticizing assembly 101. As shown in FIG. 2, feed block 120 further can include a cooling channel 242 through which a flow of cooling fluid is circulated to create a thermal break between barrel housing 113 and tubular passageway 119. The angle α of inlet surface 237 allows feed block 120 to be used when extruder 100 is oriented horizontally, that is, by coupling feed assembly 102 to feed block in an orientation that is 180° to the orientation shown.

Figure 3:
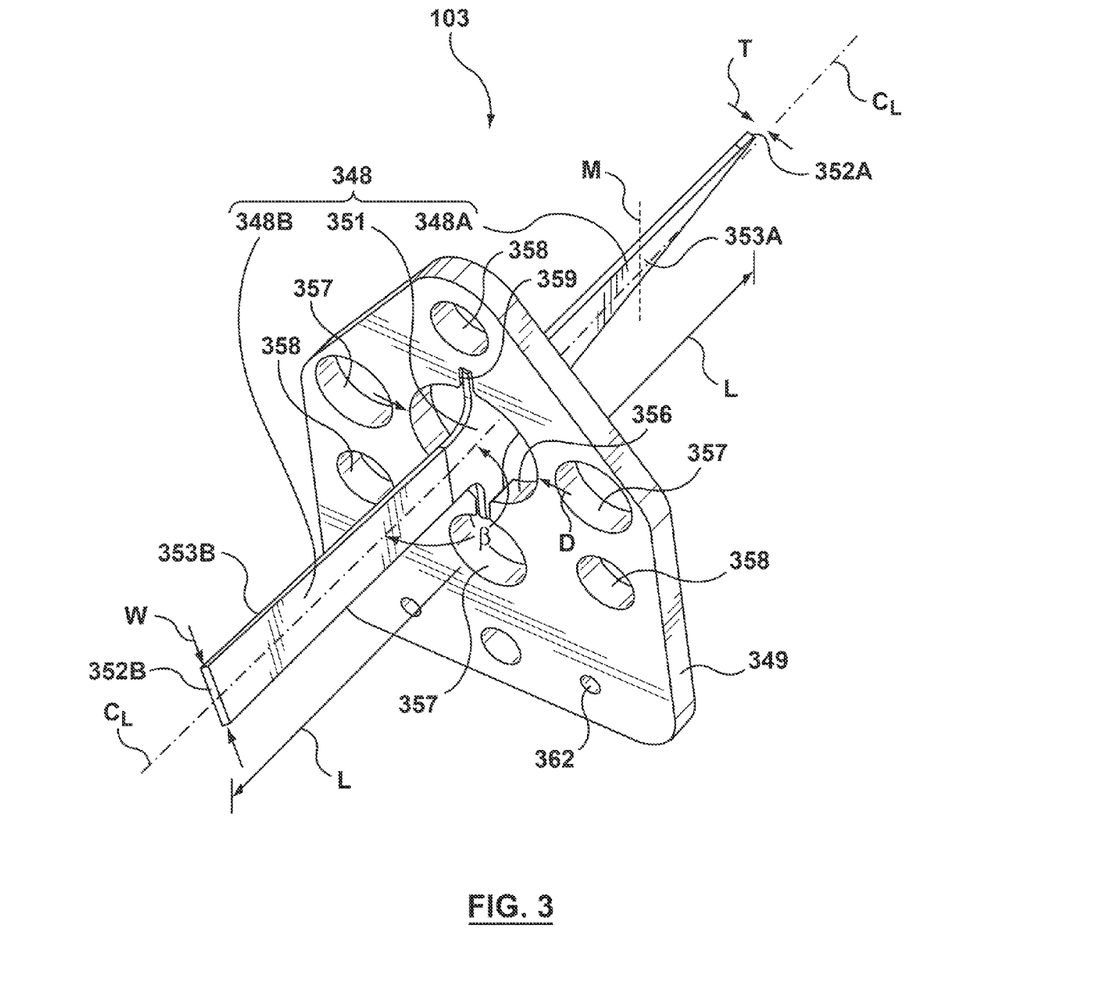
FIG. 3 is a perspective view of the feed path vibrator of FIG. 1A.

Continuing with FIG. 2, and also referring now to FIG. 3, which is a perspective view of feed path vibrator 103. Feed path vibrator 103 includes an imparting portion 348, and a transfer portion 349, which is configured to be coupled to a vibrator 250 in order to transfer vibrational energy from vibrator 250 (shown in FIG. 2) to imparting portion 348. Vibrator 250 is positioned outside of feed path 117, and, in the current embodiment, is coupled to transfer portion 349 by a fastener 261 extending through vibrator 250 (as shown in FIG. 2) that is received in a vibrator coupling bore 362 in transfer portion 349. Imparting portion 348 is an elongate blade-like member that extends within feed path 117.

Imparting portion 348 includes opposing side surfaces 353A, 353B, a length L, a width W and a thickness T and further includes a central axis or center line $C_L$ that extends along the length of imparting portion 348, through the midpoints of width W and thickness T. Imparting portion 348 includes an upstream imparting portion 348A, a downstream imparting portion 348B, and a connecting portion 351 by which imparting portion 348 is attached to transfer portion 349. In accordance with embodiments hereof, at least a portion of imparting portion 348 is twisted along its length.

As shown in FIG. 1A, imparting portion 348 extends between two components that define a portion of feed path 117. Upstream imparting portion 348A projects into lower feed pipe 125 and downstream imparting portion 348B projects into feed block 120. Continuing with FIG. 3, the segment of centerline $C_L$ that passes through upstream portion 348A is aligned with the segment of centerline $C_L$ that passes through connecting portion 351, whereas the segment of centerline $C_L$ that passes through downstream portion 348B is disposed at an angle β relative to the segment of centerline $C_L$ that passes through connecting portion 351 such that downstream portion 348B may be considered to be slightly bent to conform to the passageway 135 of feed block 102. In an alternative embodiment, feed vibrator 103 is disposed in a portion of a feed assembly that is straight (not shown), and imparting portion 348, and thus centerline $C_L$ extending therethrough is also straight. In a further alternative embodiment (not shown), feed path vibrator 103 is disposed in a portion of a feed assembly that is curved, and upstream and downstream imparting portions 348A, 348B and thus centerline $C_L$ extending therethrough also have a curved shape that conforms to the curve of feed assembly.

The following details regarding imparting portion 348 illustrate details of a non-limiting embodiment of feed path vibrator 103. Regarding the length L of imparting portion 348, the ratio of the length L of imparting portion 348 to the diameter D of feed path 117 can be generally in the range of about 3:1 to about 10:1; however, other length to diameter ratios that are outside of this range are contemplated if required by the particular application. In the current embodiment, the ratio of the length L of imparting portion 348 to the diameter D of feed path 117 is about 6:1. Regarding the width W of imparting portion 348, the ratio of the width W of imparting portion 348 to the diameter D of feed path 117 can be generally in the range of about 1:4 to about 7:8; however, other width to diameter ratios for imparting portion 348 that are outside of this range are contemplated if required by the particular application. For example, in some applications it may be desirable for imparting portion 348 to extend across the diameter D of feed path, such that the ratio of the width W of imparting portion 348 to the diameter D of feed path 117 is 1:1. In the current embodiment, the ratio of the width W of imparting portion 348 to the diameter D of feed path 117 is about 1:2. As shown in FIG. 3, the width W of imparting portion 348 is constant along its length L. However, the width W of imparting portion 348 can also change along its length L. For example, the width W of imparting portion can taper from connecting portion 351 towards the upstream and downstream ends 352A, 352B of imparting portion 348. In another example, the width W of upstream imparting portion 348A can be different than the width W of downstream imparting portion 348B.

The thickness T of imparting portion 348 is selected so as to permit vibrational energy to travel from connecting portion 351 to distal ends 352A, 352B. For example, depending on the output force of vibrator 250, the thickness T of imparting portion 348 can be within the range of 1.0 mm to 5.0 mm; however, other thicknesses that are outside of this range are contemplated. In the current embodiment, vibrator 250 has an output force of 5.4 bar at 80 psi, and the thickness T of imparting portion 348 is 1.5 mm.

As shown in FIG. 3, the thickness T of imparting portion 348 is constant along its length L. However, the thickness T of imparting portion 348 can vary along its length L. For example, the thickness T can taper from connecting portion 351 towards each of distal ends 352A, 352B. In another example, the thickness T of upstream imparting portion 348A can be different than the thickness T of downstream imparting portion 348B.

Connecting portion 351 connects imparting portion 348 to transfer portion 349, and generally defines the boundary between upstream imparting portion 348A and downstream imparting portion 348B. As shown in FIG. 3, connecting portion 351 is centered on imparting portion 348 such that the length of upstream imparting portion 348A and the length of downstream imparting portion 348B are substantially equal. However, in an alternative embodiment (not shown), connecting portion 351 is offset on imparting portion 348 such that the length of upstream imparting portion 348A and the length of downstream imparting portion 348B are unequal. In another alternative embodiment, connecting portion 351 is disposed at an end of imparting portion 348 such that imparting portion 348 extends in either the upstream or the downstream direction depending on how feed path vibrator 103 is positioned in feed path 117.

In accordance with embodiments hereof, imparting portion 348 includes at least one twisted portion along its length, such that, relative to connecting portion 351, distal ends 352A, 325B are twisted about central axis or center line $C_L$ in opposite directions. In the current embodiment, connecting portion 351 is generally straight, having flat planar side surfaces, whereas an upstream segment of the longitudinally extending side surface 353A of imparting portion 348 gradually turns about centerline $C_L$ in the clockwise direction from connecting portion 351 to distal end 352A, and a downstream segment of side surface 353A gradually turns about centerline $C_L$ in the counter clockwise direction from connecting portion 351 to distal end 352B, and is bent at angle β relative to connecting portion 351 as described above. That is, for at least a portion of the length L of imparting portion 348, each of opposing side surfaces 353A, 353B is twisted or turned around centerline $C_L$ to form a generally spiraling or helical pathway that longitudinally extends between distal ends 352A, 352B against which raw polymeric pellets may pass, quiver, shake, or tremble as they move along feed path 117, as explained further below.

Figure 4:
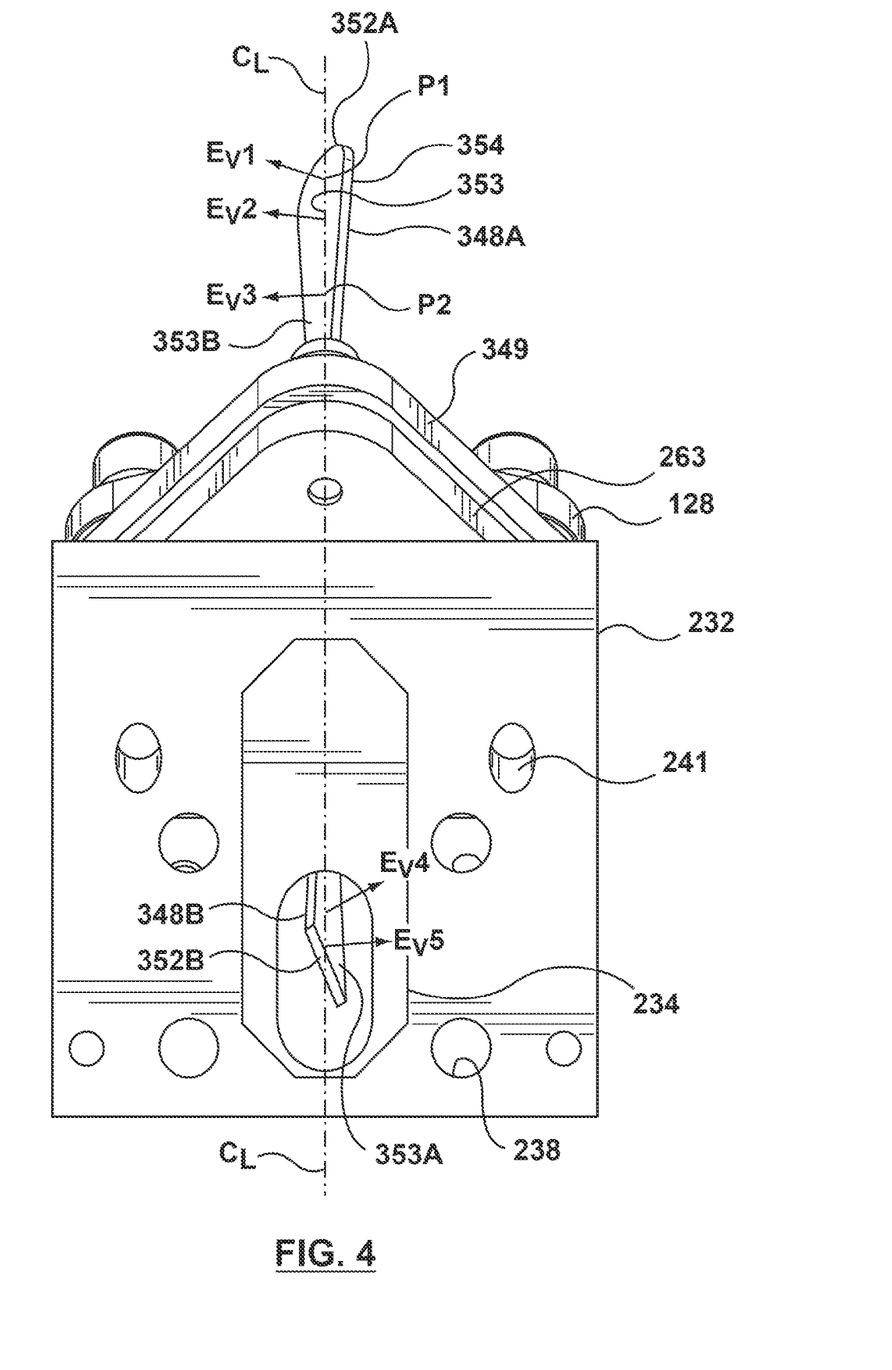
FIG. 4 is a bottom perspective view of the mounting assembly of FIG. 2.

For example, as oriented in FIG. 3, connecting portion 351 is oriented substantially vertical whereas, as oriented in FIG. 4, which is a bottom perspective view of mounting assembly 231 of FIG. 2, the angular orientation of upstream distal end 352A is rotated to the right by approximately 30°, and the angular orientation of downstream distal end 352B is rotated to the left by approximately 30°. That is, from upstream distal end 352A to downstream distal end 352B, side surfaces 353A, 353B are turned or twisted about its central axis by approximately 60° during formation. In other words, from distal end 352A to distal end 352B, imparting portion 348 makes $\frac{1}{6}^{th}$ of a complete rotation, revolution or turn about its central axis, not including connecting portion 351, which in the current embodiment remains untwisted or flat. In alternative embodiments (not shown), imparting portion 348 can be twisted more than $\frac{1}{6}^{th}$ of a complete revolution along its length, or can be twisted less than 1/16th of a complete revolution along its length. In general, the amount of twist given to upstream and downstream imparting portions 348A, 348B is such that each of opposing side surfaces 353A, 353B faces generally outward towards the respective lower feed pipe 125 or feed block 120 within which it extends. In other words, each of side surfaces 353A, 353B faces outward towards a component that is not actively vibrated, or is dampened from vibration, for example, feed block 120 or lower feed pipe 125.

Continuing with FIG. 3, the twist of upstream imparting portion 348A, and the twist of downstream imparting portions 348B are constant from connecting portion 351 to distal ends 352A, 352B. However, in an alternative embodiment (not shown), the twist of upstream imparting portion 348A and the twist of downstream imparting portion 348B can also vary from connecting portion 351 to each of distal ends 352A, 352B. For example, from connecting portion 351 to the midpoint M of upstream imparting portion 348A, the change in the angular orientation of side surfaces 353A, 353B may be 45°, or 1/4 of a complete turn, whereas from midpoint M to distal end 352A, the change in the angular orientation of side surfaces 353A, 353B may be 30°, or 1/12 of a complete turn.

In another alternative embodiment (not shown), imparting portion 348 includes a straight, untwisted section, other than connecting portion 351, that is adjacent to a twisted section, and in a further alternative embodiment (not shown) the entire imparting portion 348, including connecting portion 351, is twisted along its length.

Turning now to FIG. 4, and also referring to FIG. 1A, as raw polymeric pellets pass over feed path vibrator 103 they are vibrated by imparting portion 348. As shown by arrows $E_V1$-$E_V5$, the change in the angular orientation of imparting portion 348 between distal ends 352A, 352B also changes the angular orientation of vibrational energy $E_V$ along side surfaces 353A. 353B, between distal ends 352A, 352B, that is imparted from side surfaces 353A, 353B. That is, the twisted shape of imparting portion 348 randomly applies or scatters vibrational energy $E_V$ that is imparted from side surfaces 353A, 353B to pellets in feed path 117. For example, at a first position that corresponds to arrow $E_V1$, vibrational energy $E_V$ has a first angular orientation, and at a second position that corresponds to arrow $E_V2$ vibrational energy $E_V$ has a second angular orientation, and at a third position that corresponds to arrow $E_V3$ vibrational energy $E_V$ has a third angular orientation, each of which is different from the other. This continuous change in orientation of vibrational energy $E_V$ upsets the orientation and/or position of the pellets within feed path 117, which reduces the likelihood of the pellets bridging, or locking together. Furthermore, although imparting portion 348 is twisted along its length, as shown at distal end 352B, opposing side surfaces 353A, 353B are also generally parallel to each other. In an alternative embodiment (not shown), imparting portion 348 may be formed such that, as measured across the width W of imparting portion 348, each of side surfaces 353A, 353B may be concave, such that imparting portion 348 has a cross section that is generally dished shaped or pinched, and in another alternative embodiment (now shown), imparting portion 348 may be formed such that, as measured across the width W of imparting portion 348, each of side surfaces 353A, 353B may be convex, such that imparting portion 348 has a cross section that is generally diamond shaped or bulged. In such embodiments, concave or convex side surfaces further assist in scattering vibrational energy $E_V$ within feed path 117.

In accordance with embodiments hereof, vibrator 250 is the sole source of energy input to imparting portion 348. Vibrator 250 vibrates at a range between, for example, 5 Hz and 20 kHz; however frequencies outside this range are also contemplated if required by a particular molding application. An example of a suitable vibrator 250 is a pneumatic turbine vibrator such as a Turbomite CVT-P Series™ Turbine Vibrator from Cleveland Vibrator Company of Cleveland, Ohio, U.S.A. In general, vibrator 250 can be vibrated at a relatively lower frequency and at a relatively higher amplitude for relatively larger polymeric pellets having a higher mass; vibrator 250 can be vibrated at a mid-range frequency and at a range of amplitudes for medium sized polymeric pellets having a medium mass; and vibrator 250 can be vibrated at a relatively higher frequency and at a relatively lower amplitude for relatively smaller polymeric pellets having a low mass. Furthermore, vibrator 250 can be vibrated at a relatively lower frequency and at relatively higher amplitude for polymeric pellets having a shape that is conducive to interlocking, for example, cylindrical shaped. Furthermore, vibrator 250 can continuously vibrate, or can intermittently vibrate. An example of intermittent vibration of vibrator 250 includes an injection molding application in which vibrator 250 is activated only during the recovery stage of the molding cycle, i.e., when a shot of raw molding material is admitted into barrel channel 109 to be plasticized. In addition, the frequency at which vibrator 250 is vibrated can be constant, or can be varied depending on the particular molding application. In view of the exemplary vibration scenarios described above, it should be noted that due to the interaction of a number of variables including, inter alia, the natural frequency of imparting portion 348, the amount of vibrational energy that is transmitted through imparting portion 348, the size and shape of the polymeric pellets being processed, the moisture content of the pellets, the ambient temperature and humidity, it may be necessary to use a combination of, or sequence of, some or all of the above described scenarios in order to promote the flow of raw pellets within feed path 117.

Returning to FIG. 3, transfer portion 349 is the portion of feed path vibrator 103 that is operably coupled to a source of vibrational energy. Accordingly, transfer portion 349 and imparting portion 348 can be considered actively vibrated components. Transfer portion 349 extends radially outward relative to imparting portion 348, and is a provided in the form of a flat plate. Transfer portion 349 includes a plurality of bores extending therethrough, specifically, a transfer aperture 356, a clearance bore 357, and a dampener bore 358. In the current embodiment, transfer portion 349 includes three dampener bores 358 arranged in a triangular pattern around transfer aperture 356, and three clearance bores 357 also arranged in a triangular pattern around transfer feed aperture 356. As shown in FIG. 3, the triangular pattern of dampener bores 358 points in one direction (upward as viewed on page), whereas the triangular pattern of clearance bores 357 points in a direction that is opposite to that of the triangular pattern of dampener bores 358 (downward as viewed on page).

Transfer aperture 356 defines a portion of feed path 117, and includes a notch 359 that is sized to receive connecting portion 351. In the current embodiment, transfer portion 349 includes two notches 359 that extend through transfer portion 349, and connecting portion 351 is sized to extend across transfer aperture 356 and into each notch 359.

Imparting portion 348 and transfer portion 349 can be formed as separate components that are integrally fixed together by, for example, brazing, welding, or the like;

however, in an alternative embodiment (not shown), imparting portion 348 and transfer portion 349 are formed as a unitary body by, for example, casting, or an additive manufacturing process such as direct metal laser sintering. Further, imparting portion 348 and transfer portion 349 can be made from the same material, or can be made from different materials. Examples of suitable materials for imparting portion 348 and transfer portion 349 include those having high corrosion resistance, good fatigue resistance, and a good stiffness to weight ratio. Examples of such materials include, for example, stainless steel and aluminum. In applications where a build-up of static charge in the polymeric pellets is a concern, an electrically conductive material, for example, nonferrous stainless steel, may be useful for grounding feed path vibrator 103, thus removing the static charge from the pellets.

Figure 2A:
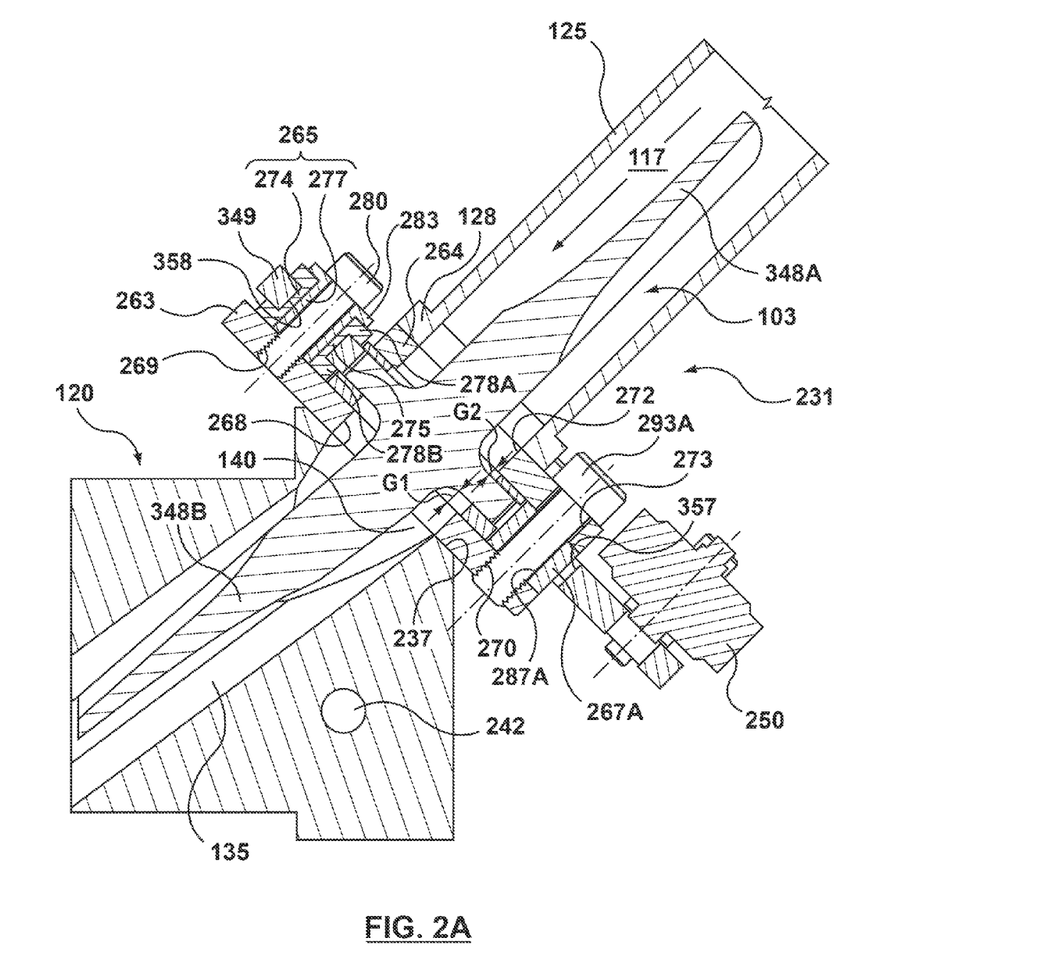
FIG. 2A is a sectional view of FIG. 2 taken along line A-A.
Figure 2B:
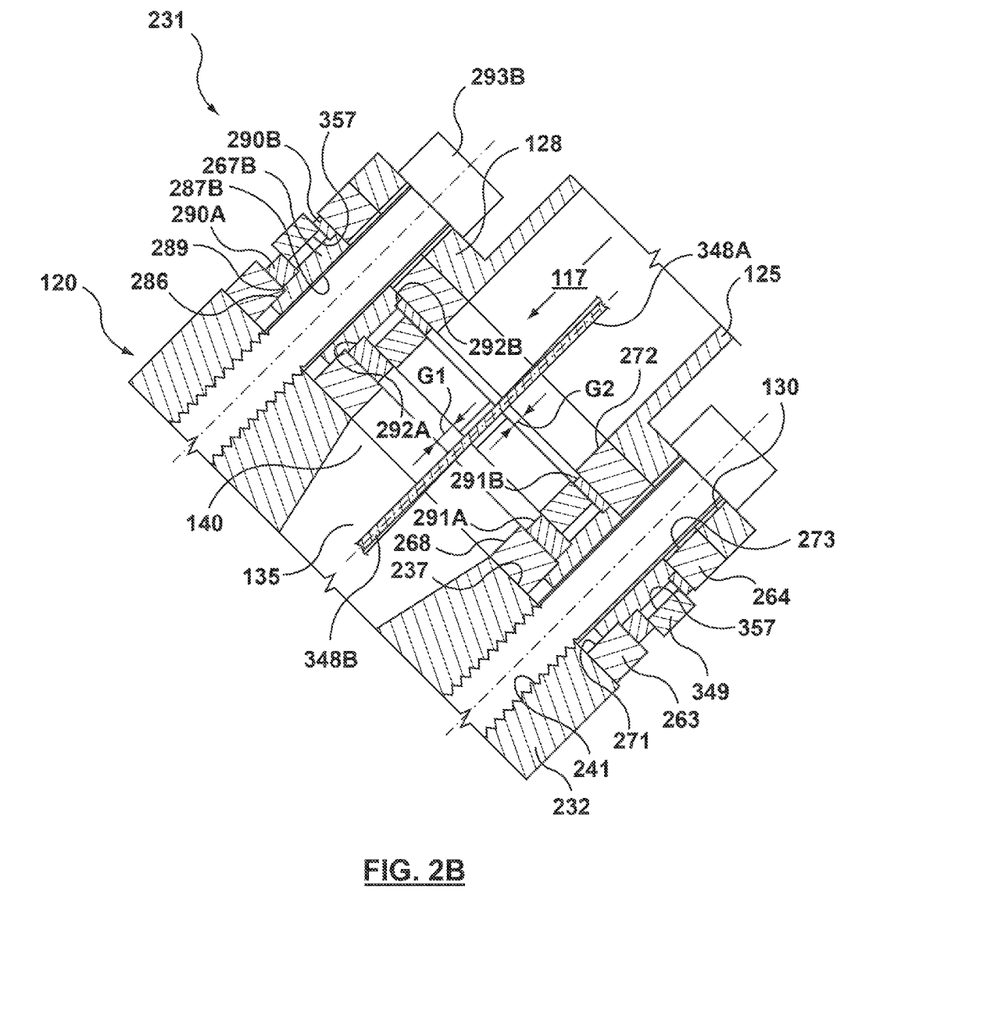
FIG. 2B is a sectional view of FIG. 2 taken along line B-B.

Returning to FIG. 2, and also referring to FIG. 2A and FIG. 2B, in which FIG. 2A is a sectional view of FIG. 2 taken along line A-A and FIG. 2B is a sectional view of FIG. 2 taken along line B-B. Mounting assembly 231 includes, a mounting plate 263, a feed pipe spacer 264, dampeners 265 (shown in FIG. 2A), spacer bushings 267A (shown in FIG. 2A), and spacer bushings 267B (shown in FIG. 2B). Feed path vibrator 103 is coupled to mounting plate 263 via transfer portion 349, and mounting plate 263 is sandwiched between feed pipe spacer 264 and feed block 120.

Mounting plate 263 provides an enlarged platform for connecting tubular passageway 119, and particularly lower feed pipe 125 thereof, with feed block 120. Mounting plate 263 includes a mounting plate feed aperture 268, a vibrator coupling bore 269 (shown in FIG. 2A), a spacer coupling bore 270 (shown in FIG. 2A), and a spacer locating bore 271 (shown in FIG. 2B). In the current embodiment, mounting plate 263 includes three vibrator coupling bores 269 arranged in a triangular pattern around mounting aperture 268, and includes two spacer locating bores 271 and one spacer coupling bore 270 that are also arranged in a triangular pattern around mounting aperture 268. The triangular pattern of vibrator coupling bores 269 is in line with the triangular pattern of dampener bores 358 in transfer portion 349, and the triangular pattern of spacer locating bores 271 together with spacer coupling bore 270 are in line with the triangular pattern of clearance bores 357 in transfer portion 349. As shown in FIG. 2B, spacer locating bores 271 are also in line with coupling bores 241 in feed block 120.

Feed pipe spacer 264 includes a spacer aperture 272, which is a portion of feed path 117, and a fastener bore 273, which extends therethrough. In the current embodiment, feed pipe spacer 264 includes three fastener bores 273 (one shown in FIG. 2A, and two shown in FIG. 2B) that are arranged in a triangular pattern around spacer aperture 264 and in line with clearance bores 357 in transfer portion 349. As shown in FIG. 2B, two of fastener bores 273 are in line with spacer locating bores 271 in mounting plate 263 and with coupling bores 241 in feed block 120, and as shown in FIG. 2A, the remaining fastener bore 273 is in line with spacer coupling bore 270 in mounting plate 263. The triangular pattern of spacer coupling bore 270 and spacer locating bores 271 helps to stabilize mounting assembly 231 and feed assembly 102.

Continuing with FIG. 2A, and also referring to FIG. 1A, to reduce the amount of vibration that vibrator 250 transfers to tubular passageway 119, feed block 120, and barrel housing 113, dampeners 265 are positioned in respective dampener bores 358 in transfer portion 349. Dampener 265 reduces the amount of vibration energy created by vibrator 250 that is transferred to mounting plate 263, and thus feed block 120 and extruder 100. Dampener 265 includes a grommet 274 and a locator 277 that extends through grommet 274. A fastener 280 extends through locator 277 to couple transfer portion 349, and thus feed path vibrator 103 to mounting plate 263. Grommet 274 includes a central portion 275, which has a diameter that corresponds to the diameter of dampener bore 358, and includes upper and lower flanges 278A, 278B. Upper flange 278A is sandwiched between transfer portion 349 and a radially extending rim 283 of locator 277, and lower flange 278B is sandwiched between mounting plate 263 and transfer portion 349 to establish a gap G1 therebetween. Grommet 274 is made from a vibration dampening material, such as, for example rubber or another elastomeric material.

The triangular arrangement of dampener bores 358 in transfer portion 349, and dampeners 256 located therein, in combination with vibrator coupling bores 269 in mounting plate 263, assists in aligning feed vibrator 103 relative to mounting plate 263, while at the same time reducing or dampening the transfer of vibrational energy from vibrator 250 to the remainder of mounting assembly 231, which limits the amount of vibrational energy that is transferred to barrel housing 113 and the remainder of extruder 100.

Continuing with FIG. 2A, and also referring to FIG. 2B, spacer bushings 267A, 267B elevate feed pipe spacer 264 from mounting plate 263, and are sized to create a gap G2 between feed pipe spacer 264 and transfer portion 349. As shown in FIG. 2A, spacer bushing 267A is a cylindrical body having an alignment bore 287A extending therethrough. A respective fastener 293A extends through fastener bore 273 in feed pipe spacer 264, through alignment bore 287A in spacer bushing 267A, and is threadably received in a respective spacer coupling bore 270 in mounting plate 263. Accordingly, tightening fastener 293A creates a compressive force between feed pipe spacer 264 and mounting plate 263.

As shown in FIG. 2B, spacer bushing 267B is a generally cylindrical body having a locator portion 286, and an alignment bore 287B that extends therethrough. Locator portion 286 is a reduced diameter portion of spacer bushing 267B that defines a step 289. Locator portion 286 is sized to be received in locating bore 271 in mounting plate 263, which aligns spacer bushing 267B relative to mounting plate 263. Spacer bushing 267B extends through clearance bore 357 without directly contacting transfer portion 349, and is sandwiched between mounting plate 263 and feed pipe spacer 264. Respective fasteners 293B extend through flange mounting holes 130 of feed pipe flange 128, through fastener bores 273 in feed pipe spacer 264, through alignment bore 287B in spacer bushing 267B, through spacer locating bore 271 in mounting plate 263, and are received in respective feed block coupling bores 241. Accordingly, tightening fastener 293B creates a compressive force between lower feed pipe flange 128, and feed block 120 to securely couple feed assembly 102 to plasticizing assembly 101.

Continuing with FIG. 2B, and also referring to FIG. 2, mounting assembly 231 further includes a first gasket 290A and a second gasket 290B which prevent polymeric pellets from escaping feed path 117 through gaps G1 and G2. First gasket 290A is sandwiched between mounting plate 263 and transfer portion 349, and is sized to correspond to the size of gap G1, and also to the thickness of lower flange 278B (shown in FIG. 2A). Second gasket 290B is sandwiched between transfer portion 349 and feed pipe spacer 264 and is sized to correspond to the size of gap G2. First and second gaskets 290A, 290B are made from a vibration dampening material in order to reduce the amount of vibrational energy that transfer portion 349 imparts to mounting plate 263 and feed pipe spacer 264. Examples of a suitable vibration dampening material include rubber or another elastomeric material.

As shown in FIG. 2B, first and second gaskets 290A, 290B include respective feed apertures 291A, 291B that are in line with feed path 117, and also include clearance holes 292A, 292B, through which one of spacer bushing 267B and spacer bushing 267A passes. In an alternative embodiment (not shown), first and second gaskets 290A, 290B can be omitted if gaps G1 and G2 are sized so as to prevent polymeric pellets from escaping feed path 117, while still maintaining gaps G1 and G2.

In the aforementioned embodiment, the specific mounting assembly 231 disclosed is by way of example and not limitation. Mounting assembly 231 may contain more or fewer components. In an alternative embodiment (not shown), mounting plate 263 is omitted, and feed block 120 is configured such that the features defined by mounting plate 263 are instead provided in inlet surface 237 of feed block 120. In another alternative embodiment (not shown), feed pipe spacer 264 is omitted and flange 128 of lower feed pipe 125 is configured to include the features defined by feed pipe spacer 264.

Figure 5:
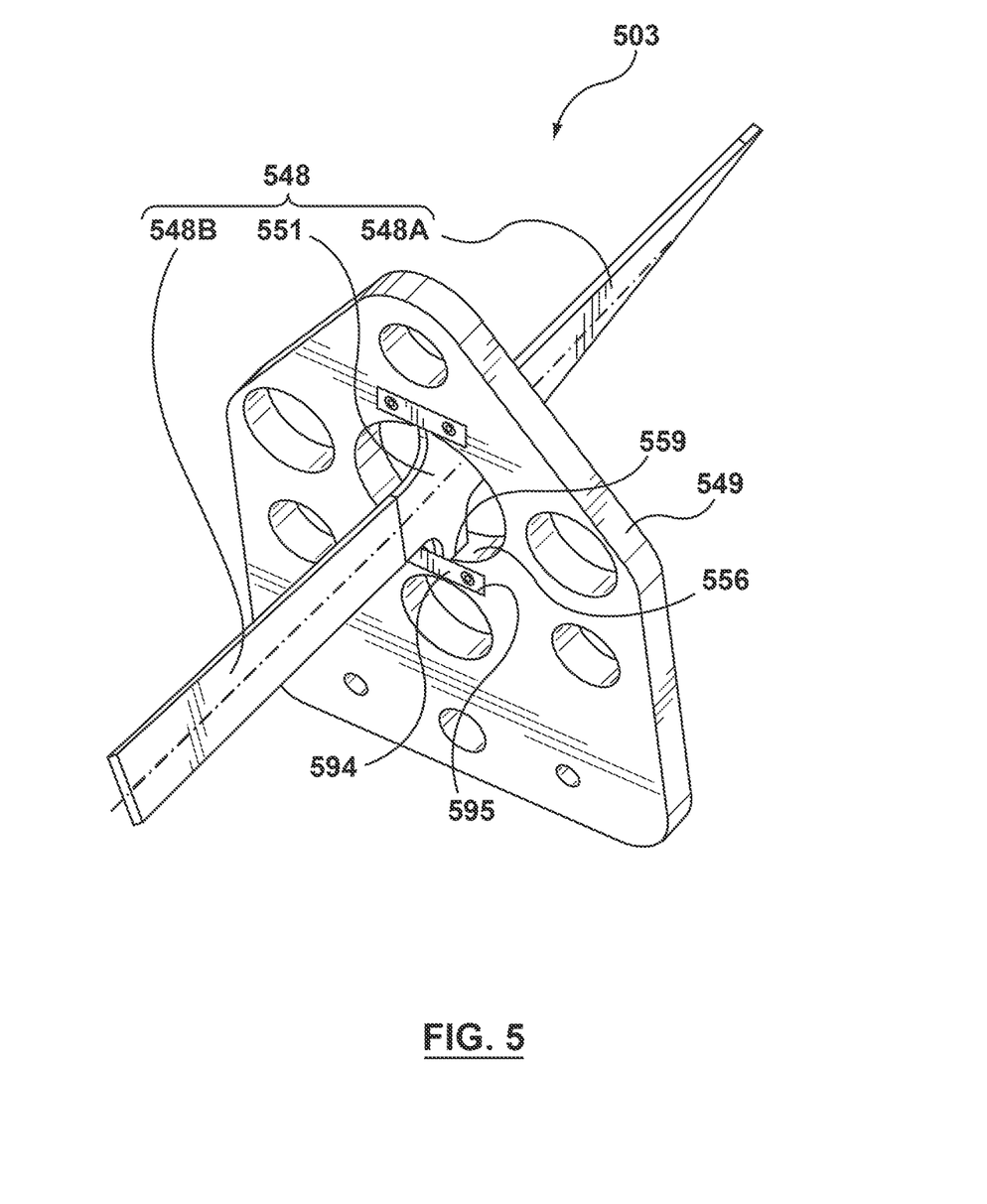
FIG. 5 is a perspective view of a feed path vibrator in accordance with another embodiment hereof.

Referring now to FIG. 5, which is a perspective view of a feed path vibrator 503 in accordance with an alternative embodiment hereof. Features and aspects of the current embodiment can be used accordingly with the other embodiments. Feed path vibrator 503 includes an imparting portion 548 and a transfer portion 549. Similar to the previous embodiment, imparting portion 548 is an elongate blade-like member that extends within feed assembly 102, and includes an upstream imparting portion 548A, a downstream imparting portion 548B, and a connecting portion 551 by which imparting portion 548 is attached to transfer portion 549.

Transfer aperture 556 includes notches 559 that extend only part way across transfer portion 549, and connecting portion 551 extends across transfer aperture 556 into each notch 559. In the current embodiment, imparting portion 548 and transfer portion 549 are separable components. To facilitate this, connecting portion 551 is held within notches 559 by respective retainers 594 that are removably secured within a pocket 595 that extends across an open end of each notch 559. Upon removal of retainers 594 from their respective pockets 595, imparting portion 548 can be separated from transfer portion 549. Separating imparting portion 549 from transfer portion 548 allows imparting portion 548 to be exchanged without also having to exchange transfer portion 549, for example, if transfer portion 548 becomes worn or damaged. Similar to the previous embodiment, examples of suitable materials for imparting portion 548 and transfer portion 549 include stainless steel and aluminum. Further, imparting portion 548 and transfer portion 549 can be made from the same material, or from a combination of materials.

The fit between connecting portion 551 and notches 559 can be anything from an interference fit, or a close slide fit, in which feed path vibrator 503 operates in a manner similar to that described in the previous embodiment, to a loose running fit, in which, in addition to imparting vibrational energy, imparting portion 548 can also shake, or rattle within feed path 117 to further upset the orientation and/or position of raw polymeric pellets within the portion of feed path 117 in which feed path vibrator 503 is disposed.

Figure 6:
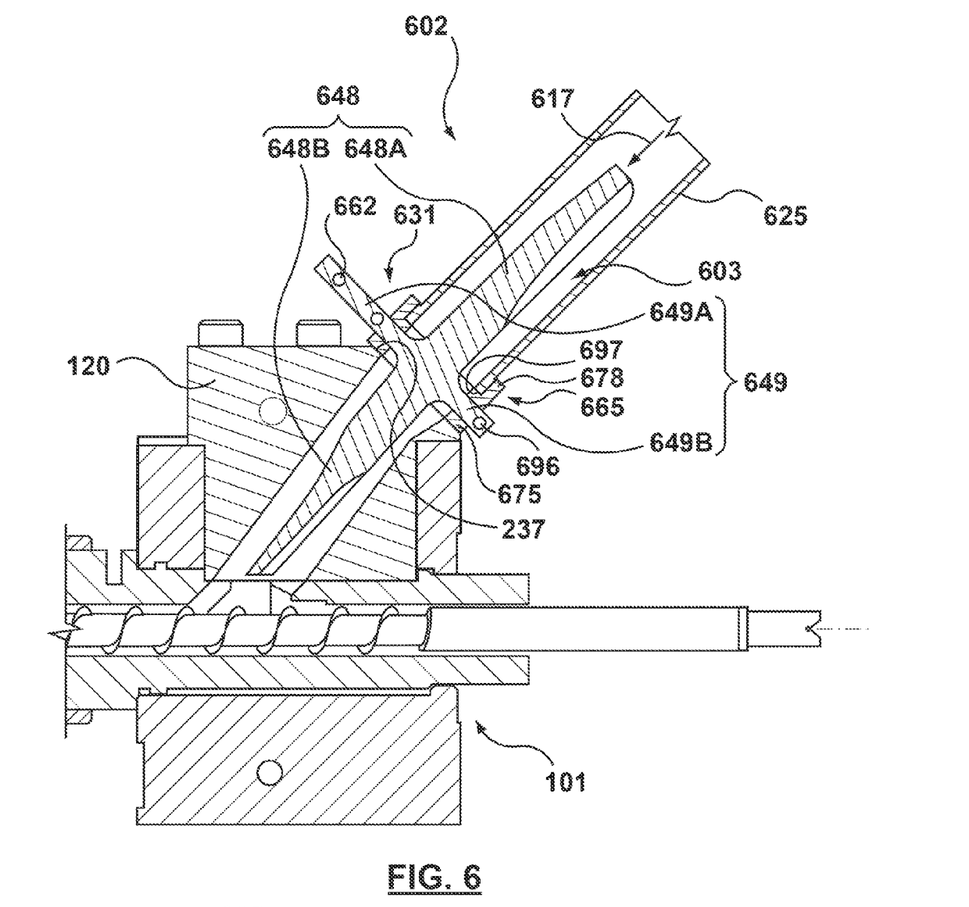
FIG. 6 is a sectional view of a portion of a plasticizing assembly, a portion of a feed assembly, and a feed path vibrator in accordance with another embodiment hereof.

Referring now to FIG. 6, which is a sectional view of a portion of plasticizing assembly 101, a portion of a feed assembly 602, a feed path vibrator 603 and a mounting assembly 631 in accordance with another embodiment hereof. Features and aspects of the current embodiment can be used accordingly with the other embodiments.

Feed path vibrator 603 includes an imparting portion 648 and a transfer portion 649. Similar to the previous embodiment, imparting portion 648 is an elongate blade-like member that extends within feed path 617, and at least a portion of which is twisted about its length. Imparting portion 648 includes an upstream imparting portion 648A and a downstream imparting portion 648B. In the current embodiment, transfer portion 649 has two arms 649A, 649B that extend outward relative to imparting portion 648. Arm 649A includes a vibrator coupling bore 662, by which a vibrator (not shown in FIG. 6) is coupled to feed path vibrator 603. A centering bore 696 that is sized to receive a locator (not shown) extends through each arm 649A, 649B of transfer portion 649, and a pair of locators (not shown), for example detent pins, are inserted through each centering bore 696 to radially position feed path vibrator 603 within feed path 617.

Figure 6A:
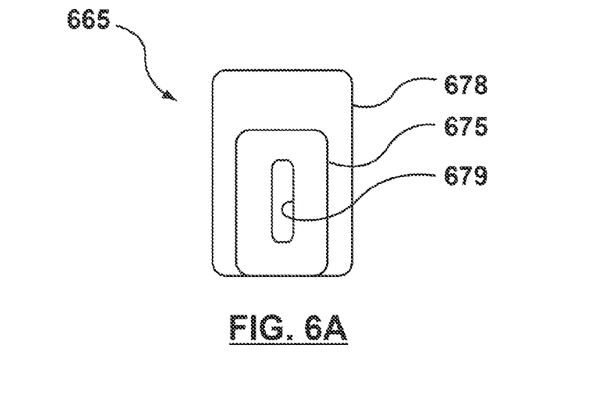
FIG. 6A is a front view of a dampener of FIG. 6 in accordance with an embodiment hereof.

Continuing with FIG. 6, mounting assembly 631 includes a dampener 665 that reduces the amount of vibrational energy that is transferred to a lower feed pipe 625 and feed block 120 from the vibrator (not shown). Referring also to FIG. 6A, which is a front view of dampener 665 of FIG. 6 in accordance with an embodiment hereof, dampener 665 includes a central portion 675, a flange 678, and an opening 679 extending through central portion 675 that is sized to receive a respective arm 649A, 649B of transfer portion 649. A pair of elongate slots 697 are formed within the downstream end of lower feed pipe 625 at diametrically opposed locations thereof, with each of the elongate slots 697 being sized to receive a respective central portion 675 of dampener 665 therein. When feed path vibrator 603 is installed in lower feed pipe 625, a respective dampener 665 is held against lower feed pipe 625 by locator (not shown) installed in centering bore 696.

To facilitate assembly of feed assembly 602, dampeners 665 are installed on each arm portion 649A, 649B of transfer portion 649 and feed path vibrator 603 is inserted into lower feed pipe 625 until central portion 675 of dampener 664 is received within slot 697. When lower feed pipe 625 is coupled to feed block 120 a respective dampener 665 is sandwiched between slot 697 and inlet surface 237 of feed block 120.

Feed path vibrator 603, or more specifically, imparting portion 648 and transfer portion 649 can be formed as a unitary body by a through-cutting process, such as, for example, plasma or water jet cutting, and is subsequently worked to apply the required twist geometry to imparting portion 648. Suitable materials for feed path vibrator 603 included those discussed having regard to the previous embodiments.

It will be apparent to persons skilled in the relevant art that various changes in form and detail can be made therein without departing from the scope of the invention. The scope of the claims should not be limited by the embodiments set forth in the examples, but should be given the broadest interpretation consistent with the description as a whole. It will also be understood that each feature of each embodiment discussed herein, can be used in combination with the features of any other embodiment.

What is claimed is:

1. A device for imparting vibrational energy to polymeric pellets in a feed path component of an extruder, the device comprising:
a feed path vibrator having
an elongate imparting portion for being disposed and vibrated within the feed path component, wherein the elongate imparting portion is a longitudinally-extending blade-like member that includes at least one twisted portion along its length, the at least one twisted portion being twisted about a central axis that extends through the blade-like member, wherein the blade-like member has opposing side surfaces that face generally outward towards the feed path component within which it resides, and a transfer portion extending from the blade-like member, the transfer portion being configured for coupling to a source of vibration energy.

2. The device according to claim 1, further comprising:

a dampener coupled to the transfer portion, the dampener for reducing the amount of vibrational energy that is transferred to the extruder.

3. The device according to claim 1, wherein the blade-like member is configured to extend between a first feed path component and a second feed path component of the extruder.

4. The device according to claim 1, wherein the feed path vibrator further includes a connecting portion extending between the transfer portion and the blade-like member.

5. The device according to claim 4, wherein the connecting portion divides the blade-like member into an upstream imparting portion and a downstream imparting portion.

6. The device according to claim 5, wherein a length of the upstream imparting portion and a length of the downstream imparting portion are unequal.

7. The device according to claim 5, wherein the at least one twisted portion has a first twisted portion that extends from the connecting portion to a first distal end of the upstream imparting portion.

8. The device according to claim 7, wherein the at least one twisted portion has a second twisted portion that extends from the connecting portion to a second distal end of the downstream imparting portion.

9. The device according to claim 8, wherein the connecting portion is generally flat.

10. The device according to claim 1, wherein the transfer portion is a plate having an aperture extending therethrough.

11. The device according to claim 10, wherein the transfer portion has a plurality of dampener bores and a plurality of clearance bores extending therethrough, and a plurality of dampeners are positioned in the plurality of dampener bores.

12. The device according to claim 11, wherein the transfer portion is configured to be coupled to a feed block of the extruder, and wherein a flange of one of the plurality of dampeners is configured to be sandwiched between the transfer portion and the feed block of the extruder.

13. A device for imparting vibrational energy to polymeric pellets in a feed path component of an extruder, the device comprising:

a feed path vibrator having an elongate imparting portion for being disposed within the feed path component, wherein the elongate imparting portion includes at least one twisted portion along its length, a transfer portion extending from the elongate imparting portion, the transfer portion being configured for coupling to a source of vibration energy, wherein the transfer portion is a plate having an aperture extending therethrough, wherein the transfer portion has a plurality of dampener bores and a plurality of clearance bores extending therethrough, and a plurality of dampeners are positioned in the plurality of dampener bores wherein the transfer portion is configured to be coupled to a feed block of the extruder, and wherein a flange of one of the plurality of dampeners is configured to be sandwiched between the transfer portion and the feed block of the extruder; and a mounting plate, and wherein the flange of the one of the plurality of dampeners is sandwiched between the transfer portion and the mounting plate.

14. The device according to claim 13, further comprising:

a plurality of spacers extending through the plurality of clearance bores in the transfer portion, wherein the plurality of spacers are configured to be sandwiched between the mounting plate and a feed pipe of the extruder.

15. The device according to claim 14, further comprising:

a feed pipe spacer positioned between the plurality of spacers and the feed pipe.

16. The device according to claim 1, wherein the blade-like member and the transfer portion are separable.

17. The device according to claim 1, wherein the blade-like member and the transfer portion are made from different materials.

18. A device for imparting vibrational energy to polymeric pellets in a feed path of an extruder, the device comprising:

a feed path vibrator having an elongate imparting portion for being disposed within the feed path, wherein the elongate imparting portion includes at least one twisted portion along its length, a transfer portion extending from the imparting portion, the transfer portion being configured for coupling to a source of vibration energy, wherein the transfer portion comprises a first arm portion extending from the elongate imparting portion in a first direction, and a second arm portion extending from the elongate imparting portion in a second direction, and a dampener having an opening extending therethrough sized to receive a respective arm portion of the transfer portion.

19. The device according to claim 1, wherein a ratio of a length of the blade-like member to a diameter of the feed path component of the extruder within which it resides is within a range of about 3:1 to about 10:1.

20. The device according to claim 1, wherein a ratio of a width of the blade-like member to a diameter of the feed path component of the extruder within which it resides is within the range of about 1:4 to about 7:8.

21. The device according to claim 1, wherein a width of the blade-like member extends across a diameter of the feed path component of the extruder within which it resides.

22. The device according to claim 1, wherein the blade-like member has opposing side surfaces that are generally parallel.

* * * * *